US006118204A

United States Patent [19]

Brown

[11] Patent Number: 6,118,204

[45] Date of Patent: Sep. 12, 2000

[54] LAYERED METAL FOIL SEMICONDUCTOR POWER DEVICE

[76] Inventor: Paul M. Brown, 9510 Sunflower, Boise, Id. 83704

[21] Appl. No.: 09/241,468

[22] Filed: Feb. 1, 1999

[51] Int. Cl.[7] .................... H01M 14/00

[52] U.S. Cl. .................... 310/303; 136/202; 429/5

[58] Field of Search .................... 310/301, 302, 310/303, 305; 136/202, 253; 429/5

[56] References Cited

U.S. PATENT DOCUMENTS

| | | | |
|---|---|---|---|
| 3,257,570 | 6/1966 | Dehmelt et al. | 310/303 |
| 3,344,289 | 9/1967 | Knight | 310/303 |
| 4,967,112 | 10/1990 | Day | 310/304 |
| 5,087,533 | 2/1992 | Brown | 429/5 |
| 5,246,505 | 9/1993 | Mowery, Jr. | 136/202 |
| 5,280,213 | 1/1994 | Day | 310/302 |
| 5,605,171 | 2/1997 | Tam | 136/253 |
| 5,606,213 | 2/1997 | Kherani et al. | 310/303 |
| 5,616,928 | 4/1997 | Russell et al. | 250/515.1 |
| 5,642,014 | 6/1997 | Hillenius | 310/303 |
| 5,770,988 | 6/1998 | Goto et al. | 333/236 |
| 5,859,484 | 1/1999 | Mannik et al. | 310/303 |

*Primary Examiner*—Nick Ponomarenko
*Assistant Examiner*—Burton Mullins
*Attorney, Agent, or Firm*—Ken J. Pedersen; Barbara S. Pedersen

[57] ABSTRACT

The present invention is a power cell for directly converting ionizing radiation into electrical energy. The invented isotopic electric converter provides an electrical power source that includes an electronegative material layered in a semiconductor, to form a first region that has a high density of conduction electrons, and an electropositive material also layered in the semiconductor material to form a second region with a high density of holes. Said N-layers region and P-layers region are separated by a neutral zone of semiconductor material doped with a radioactive isotope, such as, but not limited to, tritium. No junction is formed between the N and P layers regions. Rather, the potential gradient across the neutral zone is provided by the difference between the work functions of the electronegative and electropositive electrodes. Electrical contacts are affixed to the respective regions of the first and second type conductivity which become the anode and cathode of the cell, respectively. Beta particles emitted by the tritium generate electron-hole pairs within the neutral zone, which are swept away by the potential gradient between the first and second regions, thereby producing an electric current.

20 Claims, 4 Drawing Sheets

VOLTAGE-CURRENT CURVE FOR TRITIUM BATTERY.

MULTILAYER TRITIUM FILM BATTERY

LAYERED METAL FOIL SEMICONDUCTOR POWER DEVICE

BACKGROUND OF THE INVENTION

1. Field of the Invention.

The present invention generally relates to apparatus for the direct conversion of radioactive decay energy to electrical energy without going through a thermal cycle, and more particularly, it relates to semiconductor power cells which convert ionizing radiation directly into electrical energy.

2. Related Art

The decay of radioactive materials produces electrically charged particles such as alpha and beta particles as well as photons such as gamma rays. As with other nuclear processes, the charge scale of these types of radiation is millions of times greater than in non-nuclear processes.

For example, isotope Americium-241 has a half-life of 458 years and produces alpha decay which can introduce 5.5 million electron volts (MeV) into a typical ionizable material. On the average, only 3.6 electron volts (eV) are necessary to produce one electron-hole pair within the typical semiconductor material. Thus, for every alpha particle traveling through a semiconductor material, approximately 1.5 million electron-hole pairs may be formed by the absorption of the single alpha particle. This phenomenon of many electron-hole pairs for each particle is known as the multiplication factor for power cells based on radioactive decay. In contrast, for a typical photo-cell, having no multiplication factor, each photon that is absorbed by a photon-responsive semiconductor material generates only one electron-hole pair.

Heretofore, there have been known several methods for conversion of radioactive energy released during the decay of natural radioactive elements into electrical energy. To date, the only type of device with practical application has been the so-called Radioisotopic Thermoelectric Generator (RTG), utilized primarily by NASA in space-based applications. Other technologies have been explored, including the pn-junction type converter, and are currently under development by several laboratories, but none of the other technologies have yet seen substantial commercial application.

U.S. Pat. No. 5,087,533 entitled “Contact Potential Difference Cell” issued to Paul Brown on Feb. 11, 1992, discloses an isotopic electric converter comprised of dissimilar metallic electrodes separated by a semiconductor medium. Said semiconductor medium has a radioactive isotope dispersed throughout. Radioactive decay produces ions in the semiconductor that are swept away by the contact potential difference, which is a result of the difference in work functions of the two dissimilar metals. This device is relatively bulky and inefficient due to the metallic electrodes, and recombination within the semiconductor, together with space charge effects, limit its efficiency, resulting in relatively low power density.

U.S. Pat. No. 5,246,505 (Patent ’505) entitled “System and Method to Improve the Power Output and Longevity of a Radioisotope Thermoelectric Generator” issued to Alfred Mowery, Jr., on Sep. 21, 1993, discloses an apparatus which provides electrical power by utilizing the waste heat generated by a large amount of radioactive material, typically plutonium. In the process of Patent ’505, thermocouples placed about the heat source convert said heat energy into electricity. Helium outgassing is used for cooling to reduce thermal degradation effects, which yields a greater working life for the apparatus. However, all the problems inherent to the RTG design are still present, namely, the apparatus is large and massive and works with great inefficiency, and substantial shielding is required because the radioisotope employed is of great health risk.

U.S. Pat. No. 5,280,213 (Patent ’213) entitled “Electric Power Cell Energized by Particle and Electromagnetic Radiation” issued to John Day on Jan. 18, 1994. Patent ’213 discloses a secondary emission type power cell wherein ionizing radiation is attenuated by a secondary emissive material (a material that emits secondary electrons) in order to generate slow-moving secondary electrons for charging metal capacitor plates separated by dielectric material. This type of apparatus does exhibit a multiplication factor, but is limited by the use of the dielectric material to pulsed operation. Recombination within the secondary emitter limits the efficiency of the apparatus.

U.S. Pat. No. 5,605,171 (Pat. ’171) entitled “Porous Silicon with Embedded Tritium as a Stand-Alone Prime Power Source for Optoelectronic Applications” issued to Shiu-Wing Tam on Feb. 25, 1997. Patent ’171 discloses a radioluminescent apparatus coupled with a photovoltaic cell, wherein radioactive decay energy is converted into light energy that is then, in turn, converted into electricity by a solar cell. Although these types of cells are fairly reliable, their efficiency is severely limited by the indirect method used for the energy conversion.

U.S. Pat. No. 5,606,213 entitled “Nuclear Batteries” issued to Nazir Kherani et al. on Feb. 25, 1997 and discloses a nuclear battery made by incorporating radioactive tritium in a body of amorphous semiconductor material. An electropositive conductivity region and an electronegative conductivity region, with a semiconductor junction therebetween, are provided in the semiconductor material, with the electropositive and electronegative regions being connected to a load circuit. This type of cell lacks stability, however, and soon loses its powergenerating effectiveness, which loss is attributed to dangling-bond degradation.

U.S. Pat. No. 5,616,928 entitled “Protecting Personnel and the Environment From Radioactive Conditions by Controlling Such Conditions and Safely Disposing of Their Energy” issued to Virginia Russell on Apr. 1, 1997. This patent discloses a primary charging apparatus wherein a radioactive source is enclosed within a body consisting of metal plates. The metal plates are separated by dielectric material, forming a capacitor housing that is charged by the decay particles. Primary cells based on this disclosed invention will operate at very high voltage and in a pulsed manner. Also, their space charge effects, as well as reverse leakage currents, will limit their efficiency for power generation.

U.S. Pat. No. 5,642,014 entitled “Self Powered Device”, issued to Steve Hillenius on Jun. 24, 1997, discloses a pn-junction type of isotopic electric converter provided with an integrated circuit powered by said converter. The apparatus is built of a layer of a first conductivity type and a layer of a second conductivity type to form a pn-junction depletion layer. A tritium-containing layer is provided, which supplies beta particles that penetrate the depletion layer. The penetration generates electron-hole pairs that are swept by the electric field in the depletion layer, producing an electric current. However, the problems inherent to the pn-junction type of cell are that the junction is a fragile crystalline structure and constant bombardment of beta particles causes material degradation effects. The degradation effects destroy the junction and limit its useful life, and also limit the upper power availability of this type of apparatus. Annealing or hardening of the junction has been employed to reduce the effects and provide greater operating life from such cells, but the problem of material degradation still remains.

Each of the above-cited U.S. patents discloses apparatus and means for converting radioactive decay energy into electricity, yet none of the designs has seen substantial commercial application due to the shortcomings of each design. All isotopic electric converters, no matter what type, are actually electric generators fueled by radioactive decay energy. Since that decay energy is fairly constant, the electrical output from such an apparatus is fairly constant and no means is provided for increased power demand for peak operations, such as the start-up of the electrical load. On the other hand, an electrical energy source constructed according to the principles of the present invention does not suffer the performance and efficiency limitations of the prior art.

SUMMARY OF INVENTION

It is an object of the present invention to provide a new and improved semiconductor isotopic electric converter which overcomes the deficiencies of the prior art.

It is another object of the present invention to provide a new semiconductor isotopic electric converter which utilizes alpha or beta decay particles from radioactive isotopes to generate electrical power.

Other objects of the present invention are to provide a new power source which will operate at low temperatures, have very long working life, and be unaffected by vibrations or acceleration.

Other objects of this invention is to provide a new power source which will not be damaged by an accidental short circuit, and which is light and small in size, relative to the energy it produces.

Another object of this invention is to provide a power source which is very rugged and extremely reliable; unaffected by environments such as vacuums, high pressures, corrosive atmospheres, and undamaged by temporary exposures to high temperatures.

Another object of this invention is to provide a power source whose internal resistance does not change with time.

Another object of this invention is to provide a power source which is suitable for use as a power supply in an integrated circuit chip.

Another object of this invention is to provide a new power source with built-in reserve energy for peak demand.

Other objects, features and advantages of the present invention will become apparent from the following description.

It is with these objects in mind that the present invention was developed. The present invention is a power cell for directly converting ionizing radiation into electrical energy. The isotopic electric converter of the present invention provides an electrical power source that includes: 1) an electronegative material layered in a semiconductor to form a first region (N-layers region) that has a high density of conduction electrons, and 2) an electropositive material also layered in the semiconductor material to form a second region (P-layers region) with a high density of holes. Said N-layers region and P-layers region are separated by a neutral zone of semiconductor material doped with a radioactive isotope, such as, but not limited to, tritium. No discrete junction is formed between the N and P layers regions. Rather, the potential gradient across the neutral zone is provided by the difference between the Fermi energy levels of the electronegative and electropositive electrodes. Electrical contacts are affixed to the respective regions of the first- and second-type conductivity which become the anode and cathode of the cell, respectively. Beta particles emitted by the tritium generate electron-hole pairs within the neutral zone, which are swept away by the potential gradient between the first and second regions, thereby producing an electric current. Because all points in the semiconductor neutral zone are within a diffusion distance of a doped region, the majority of electron-hole pairs are separated by the field of the potential gradient before they recombine. The separated electron-hole pairs forward bias the isotopic electric converter and thus deliver power to an electrical load. The present invention, then, is a solid-state thin-film device of layered, preferably metal, foils within a semiconductor material, and may be produced by any suitable means known in the art, such as ion-sputtering or vapor deposition.

In the free-electron model, as developed by Pauli and Sommerfeld, a metallic crystal is considered to consist of two components: the atomic nuclei together with their tightly-bound electrons, and the weakly-bound valence electrons which may be considered to belong to the entire crystalline solid rather than to any one particular atom. Each valence electron has a constant electrostatic potential that is independent of its location within the crystal. The electrostatic potential rises markedly to zero at the boundaries of the crystal. Therefore, in the free-electron model, one has a collection of a large number of free particles confined to a box, that is, an electron gas confined to the interior of the metal. However, this electron gas exists in states restricted by the Pauli exclusion principle, and thus the distribution of electrons among available states is governed by Fermi-Dirac statistics.

At absolute zero temperature, the free-electrons of a metallic crystal do not all have zero kinetic energy, as in a classical gas. Rather, there are electrons with finite energies up to a maximum energy, called the Fermi energy. According to the Pauli exclusion principle, no more than two electrons (one for each of the two possible electron spin orientations) are permitted in one particular energy state; hence, all the lowest states become filled, until one reaches the most energetic electrons. The Fermi energy is the kinetic energy of the most energetic electrons, all states of lesser energy being filled, and all states of greater energy being empty. This extraordinary behavior, in which electrons in a material at absolute zero temperature have a sizeable kinetic energy, is strictly a quantum phenomenon. The binding energy of the least-tightly-bound electrons of the metal (those at the Fermi surface) is, of course, the work function $\phi$.

An electrical power source constructed according to the principles of the present invention utilizes the principal that when two dissimilar materials having different Fermi energy levels are placed in physical contact, a Fermi potential difference will exist between the two materials, and the potential difference will be equal to the difference in Fermi energy levels. Similarly, a parallel plate capacitor having plates of dissimilar materials and shorted in an external circuit will have a potential difference across the gap between the plates. No current will flow in the external circuit between the plates because the Fermi levels of the constituent elements are equalized by an initial flow of electrons that balances their electronic structure. If the gap between the plates contains an ionized medium, such as a radioactive gas, current will flow in the external circuit due to the transfer of electrons by the ionized gas from one plate to the other. Similarly, a non radioactive gas between the plates produces the same result if it is irradiated by an ionizing flux.

According to the invention, the electrical connection between the electronegative region and the electropositive region through a load establishes a Fermi potential difference, dependent upon the relative Fermi levels of the two layers. The ionized semiconductor medium located between the electronegative region and the electropositive region completes the electrical circuit.

The preferable tritium-doped semiconductor region essentially "locks" the electron bands in place, whereby the converter surfaces can be treated in any manner desired without degrading device performance. In such an arrangement, ohmic contacts can easily be made to the converter surfaces. In fact, any adjacent oxide layers formed thereon will not alter the electron band structure to affect the performance of the device. The resulting power sources may be manufactured with power levels covering a wide range and exhibiting long lifetimes with high power densities.

Another aspect of the present invention includes an integral body consisting of two metal elements separated by a dielectric material to form a capacitor for storing electrical energy in a conventional manner for use during peak electrical demand by the load.

Since the method of manufacture of embodiments of the invention is closely related to the technique used for production of integrated circuits, it is possible to piggy-back an integrated circuit onto the isotopic electric converter or to piggy-back the converter onto the integrated circuit layers. Either method may be used to make a self-powered integrated circuit.

The present invention uniquely combines the formation by a radioactive flux of ions in an ionizable medium within an electric field with the storage capacity of a thin-film capacitor element to provide a power source having a useful life measured in years, without the need for recharging. An isotopic electric converter constructed according to the principles of the present invention is essentially a constant-voltage generator with an internal impedance determined by the materials of construction. The power cell of the present invention converts the energy of radioactive decay products directly to electrical energy, and provides an available lifetime for power generation that is a function of the radioactive half-life of the material utilized.

The present invention may be engineered to take advantage of a wide variety of radioactive isotopes, utilizing either alpha, beta, gamma, or neutron decay. Power density is simply a factor of the available radiation flux. Consequently, a low power application may only require use of a low energy isotope such as tritium, while greater power requirements may necessitate the use of an isotope of greater energy, such as plutonium-238. Gamma sources may also be used by introducing a secondary emissive layer, for the conversion of the gamma energy into Compton electrons for use by the isotopic converter to produce electricity.

DETAILED DESCRIPTION OF THE INVENTION

Figure 1:
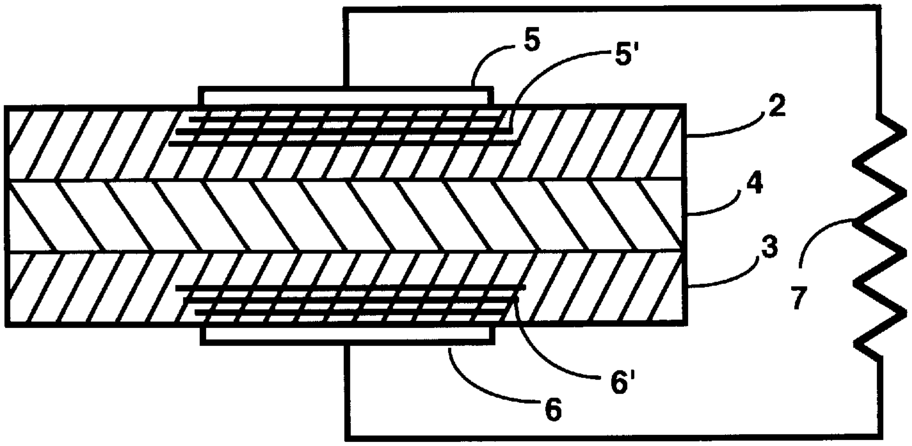
FIG. 1 is a side elevation view, in cross-section, of one embodiment of an isotopic electric converter semiconductor body in accordance with the teachings of this invention.

In accordance with the present invention, and with reference to FIG. 1, there is shown an isotopic electric converter cell 1 comprising a series of stacked thin-film layers constructed in accordance with the present invention, comprising an electronegative region 2, an electropositive region 3, separated by a neutral zone 4, where neutral zone is made of semiconductor doped with radioactive isotope. A first electrode 5 is suitably connected with the electronegative region 2, typically through the use of an ohmic contact. A second electrode 6 is suitably connected with the electropositive material 3. Said electrical connections carry electrical current to the load 7 in a conventional manner.

Within electronegative region 2 is a series of spaced-apart, parallel metal foils 5', separated by layers of semiconductor material. Preferably, the metal foils 5' are made of the same metal material, for example, nickel. The metal foils are preferably about 2 . 6 nanometers (nm) thick, and about 10–30 nm apart. They may number from about 2–10, and may vary in distance apart, preferably getting closer together as they approach first electrode 5. Each metal foil 5' is "sandwiched" between layers of semiconductor material, so that it is electrically insulated from other metal foils. Preferably, the semiconductor material between metal foils 5' is not doped with radioactive isotope.

Within electropositive region 3 also is a series of spaced-apart, parallel metal foils 6', also separated by layers of semiconductor material. Preferably, the metal foils 6' are made of the same metal material, for example, zinc, which metal is different from that of metal foils 5'. Metal foils 6' are also preferably about 2–6 nm thick, and about 10–30 nm apart. Also, they may number from about 2–10, and may vary in distance apart, preferably getting closer together as they approach second electrode 6. Each metal foil 6' is also "sandwiched" between layers of semiconductor material, so that it is electrically insulated from other metal foils. Preferably, the semiconductor material between metal foils 6' is not doped with radioactive isotopes.

The work function of the electropositive region 3, is taken to be greater than the work function of the electronegative region 2. Assuming that both regions 2 and 3 are at the same temperature, electrons will migrate across the contact circuit 7 from the material having the lower work function, electronegative region 2 in this example, to the material having the greater work function, electropositive region 3. Thus, the average energy of the electrons in the material comprising electropositive region 3 will be lowered. Similarly, the average energy level of the electrons in the material comprising electronegative region 2 will be raised. This migration of electrons across contact circuit 7 will continue until the average energy of the two regions 2 and 3 is in equilibrium. Since electrons have migrated to region 3, the material having the greatest work function, region 3, will have a net negative charge. Similarly, the material having the least work function will have a net positive charge. The resulting potential difference between the two electrodes 5 and 6 is equal to the difference in their work functions, i.e., the Fermi potential difference.

The space between the regions 2 and 3 is filled with an ionizable semiconductor 4, which, when ionized, provides a conducting medium between the regions 2 and 3. The electrons and holes in the ionized semiconductor 4 migrate to the positively and negatively charged regions, respectively, thereby providing a current flow when an external circuit through load 7 is connected. The semiconductor 4 may be ionized by any suitable well-known method. Electron-hole recombination in the semiconductor 4 does occur so that separation of regions 2 and 3 must be selected at an optimum width to minimize recombination. Preferably, electrodes 5 and 6 are about 300 nm apart. Electron-hole separation and reduction of recombination may be enhanced by the imposition of a magnetic field with the magnetic flux perpendicular to the regions 2 and 3 surfaces.

In the preferred embodiment, the semiconductor 4 is ionized by irradiation with a radioactive flux. The source of the radioactive flux may be external, such as that encountered in or near a nuclear reactor, or may be internal to the cell 1. If the semiconductor 4 is radioactive, then it will be self-ionizing. Similarly, if the material of one or both the regions 2 and 3 or electrodes 5 and 6 are radioactive, the decay products will serve as the ionizing flux.

The manufacture of the isotopic electric converter cell 1 may be accomplished in several manners including the use of the ion-sputtering technique. If the sputter deposition of the semiconductor layer 4 is performed in an atmosphere comprised of a radioactive gas, such as tritium or krypton-85, atoms of the radioactive gas get trapped within the deposited semiconductor. The loading or atom density of a radioactive isotope within the semiconductor may be controlled by varying the gas density during the sputtering process. The close-out layer of material, whether it be the electronegative or the electropositive, serves as a containing wall for any radioactive outgassing from the semiconductor layer 4.

The isotopic electric converter cell 1 may be connected in series for greater voltage or in parallel for greater current capacity. The isotopic electric converter cell 1 is preferably made into thin-film sheets, which may then the rolled or stacked as needed for assembly into any suitable containing vessel.

With further reference to FIG. 1, there is shown an isotopic electric converter cell wherein, for the electropositive region, a series of metal foils layered between semiconductor material is provided. In practice, the inventor has utilized a high work function metal for the foils for region 3, onto which the isotopic doped silicon layer 4 is ion-sputtered and the close-out region of electronegative material is provided with an ohmic contact 5. A difference in the work functions exists between metal foil region 3 and the electronegative region 2 to establish a Fermi potential difference. Radioactive flux produces electron-hole pairs in the semiconductor medium 4, which pairs are swept away by the potential gradient to deliver an electric current to the load 7 in a continuous manner.

Figure 2:
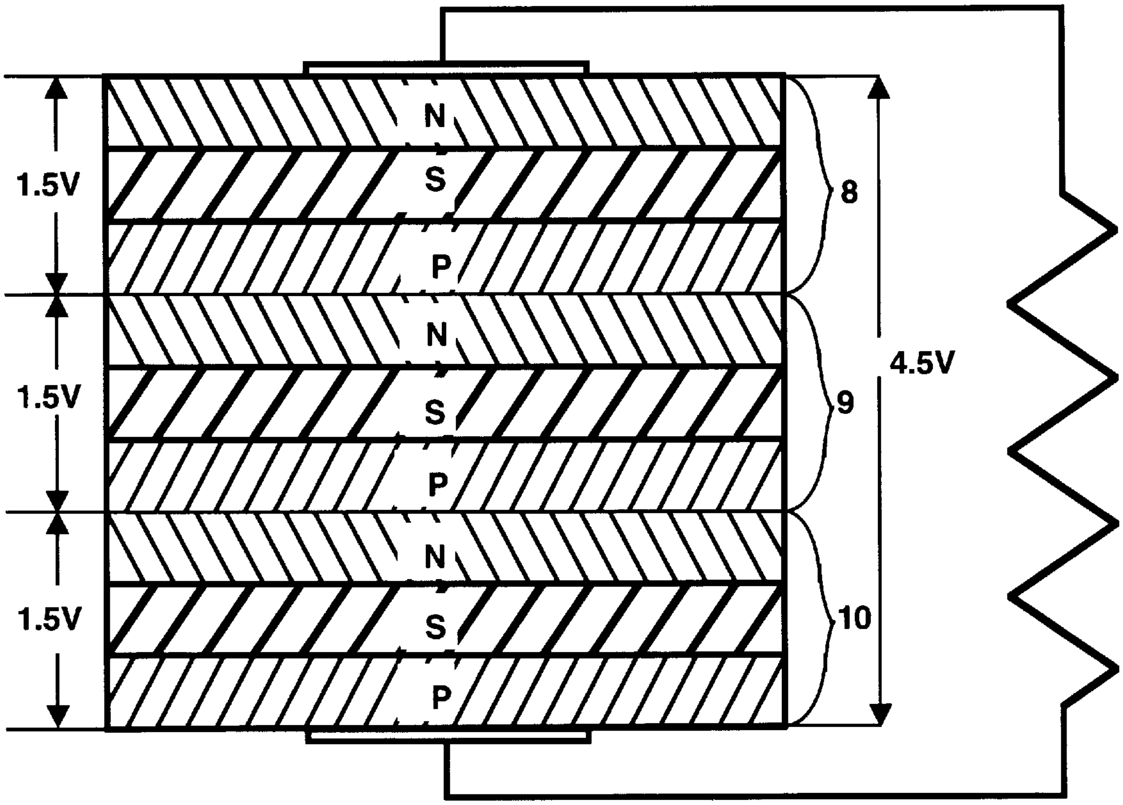
FIG. 2 is a side elevation view, in cross-section, of an embodiment of the invented isotopic electric converter comprising a plurality of bodies arranged in a stack and electrically connected in series.

With reference to FIG. 2, there is shown a plurality of isotopic electric converter cells 8, 9, 10 physically stacked and electrically connected in series. The operation of each of these isotopic electric converters is the same as detailed in FIG. 1, except that they are connected in series, which increases the output voltage in an additive manner. For instance, if a single isotopic electric converter cell produces 1.5 volts DC, then three such cells placed in series will produce 4.5 volts DC. Series connection may be made by butting of individual cells together, but the preferred method is that they be manufactured by successive thin-film layering by any suitable process such as ion-sputtering or vapor deposition.

Figure 3:
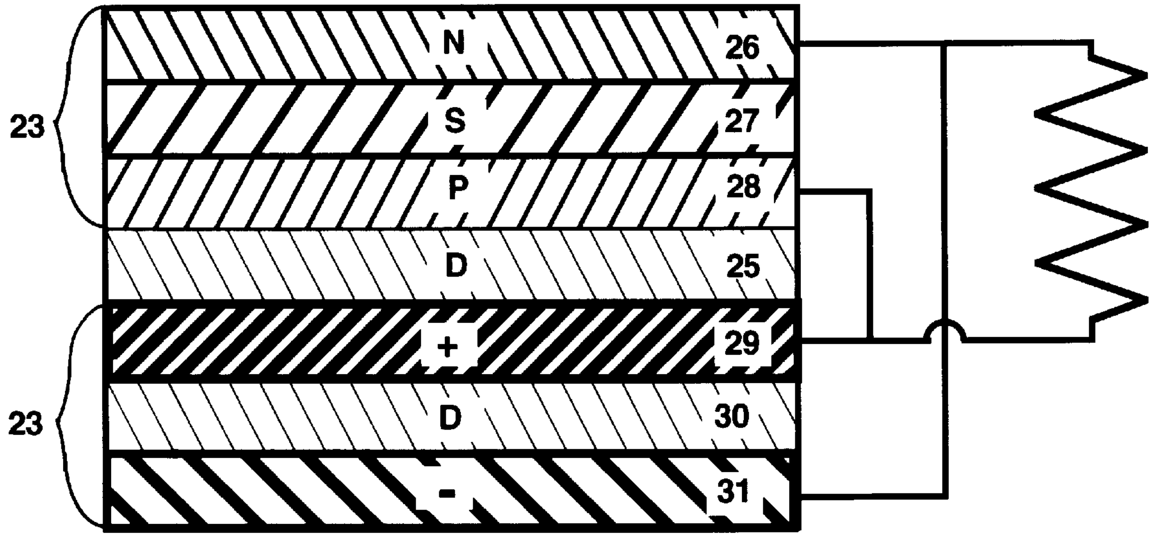
FIG. 3 is a side elevation view, in cross-section, of another isotopic electric converter, with dielectric and metallic layers to form an integral capacitor.

With reference to FIG. 3, there is shown an isotopic electric converter cell 23 provided with a capacitor assembly 24, and insulated from the assembly 24 by a dielectric material 25. The isotopic electric converter cell 23 is comprised of a region 26 of electronegative material, and region 28 is comprised of electropositive material, while the semiconductor medium 27 between regions 26 and 28 is comprised of a semiconductive material with a radioactive isotope homogeneously dispersed throughout the semiconductor medium 27. Ionizing flux, preferably beta particles, ionize the atoms of the semiconductor medium 27 generating electron-hole pairs, which are swept away by the electric field produced by the Fermi potential difference between the electronegative and electropositive regions. The capacitor assembly 24 is comprised of two metal plates 29 and 31, spaced apart and separated by a dielectric material 30. The capacitor assembly 23 operates by storing electric energy in the usual manner, and is fabricated by using a suitable thin-film technique such as ion-sputtering or vapor deposition. The electrical energy produced by the isotopic electric converter cell 23 is stored in the capacitor assembly 24 that is electrically connected in parallel with the isotopic electric converter cell 23.

Figure 4:
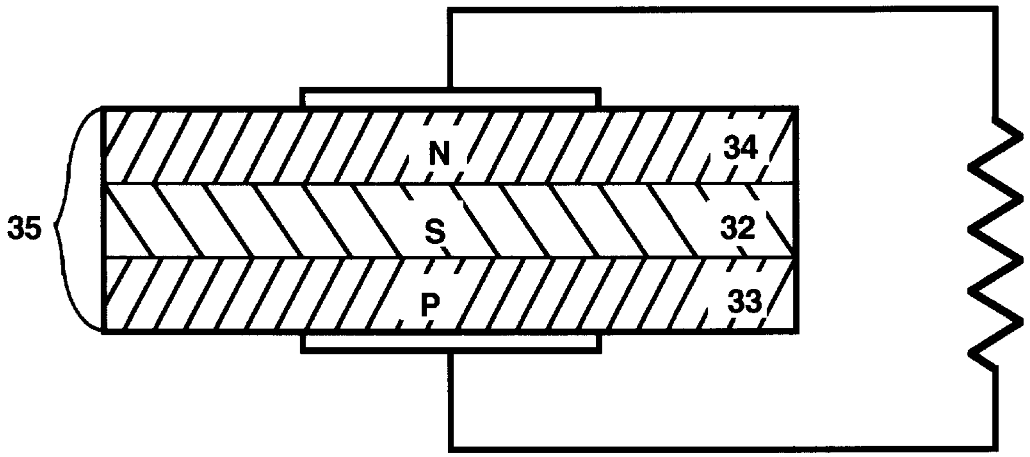
FIG. 4 is a side elevation view, in cross-section, of another isotopic electric converter wherein one of the plates is doped with, or made of, a radioactive isotope.

With reference to FIG. 4, there is shown an isotopic electric converter cell 35 wherein one of the electronegative or electropositive regions are doped with a radioactive isotope or actually made from material containing the radioactive material. As depicted, the electronegative region 34 includes a radioactive isotope that provides the radioactive flux to ionize the semiconductor layer 32, and region 33 is made of electropositive material. A Fermi potential difference is established between the active region 34 and the inert region 33. Radioactive flux produces electron-hole pairs within the semiconductor layer 32 that are swept away by the potential gradient to generate an electric current. Region 34 may contain a series of metal foils containing a radioactive isotope or region 34 may be made of another material containing the radioactive isotope. The silicon layer 32 and the electropositive region 33 may then the deposited in any suitable manner as commonly used in the art, such as ion-sputtering or vapor deposition.

In cells using tritium as the radioactive isotope, it is desirable to introduce a material such as palladium metal to absorb or combine with any outgassed tritium to physically immobilize it.

EXAMPLES

The entrapment of tritium is particularly apt in this application as it is readily substituted for the hydrogen present in hydrogenated amorphous semiconductors with good intrinsic electronic properties. Radioisotopes other than tritium, may also be used as a source of energetic electrons as well as other forms of energetic nuclear radiation such as krypton-85, for example. All films were deposited using an ion-sputtering system.

Hydrogenation of amorphous silicon is essential as it serves to significantly reduce the defect nature of amorphous silicon by terminating a majority of the defective silicon bonds. Typically 10 to 25 atomic percent hydrogen is incorporated into amorphous silicon hydride to obtain a material with good semiconductor properties. The hydrogen is bonded to silicon and can be chemically stable to temperatures of 300 degrees C. Tritiated amorphous silicon can be deposited in the form of small and large area thin films onto a wide variety of substrates, electrically conducting and insulating, using low temperature processing techniques.

Various ion-sputtering plasma deposition techniques differ in the form of excitation used and in the resulting range of operating pressure.

The metal as well as the intrinsic layers were deposited using a conventional ion sputter deposition system. The system consists of a substrate holder at one end, and a target holder at the other end. The substrate holder can be heated to 300° C. and can be biased from floating to ground potential. Tritium was stored as a tritide on a depleted uranium bed and was released by heating the bed. The temperature of the bed was used to control the equilibrium partial pressure of tritium over the bed and a calibrated pinhole was used to introduce tritium into the chamber. The system was pumped with a turbo molecular pump backed by a vacuum pump. During the tritium depositions, the exhaust of the vacuum system went to a tritium scrubber which traps tritium as tritiated water. The entire deposition system is housed in a nitrogen glovebox.

The tritium content of discharge-deposited amorphous silicon film can only be indirectly controlled via the discharge parameters and the substrate temperature. However, these parameters also affect other aspects of film growth. The relatively low pressure required to ignite a discharge allows coevaporation of silicon to directly control the silicon-tritium ratio. In this design, silicon is evaporated by rf inductive heating of high purity silicon held in a fixture. This provides relatively uniform heating.

The tritium scrubber used is a design modeled after the tritium scrubber in use at Lawrence Livermore National Laboratory. A tritium scrubber positioned after the two vacuum pumps, is used to strip tritium from the chamber effluent, by converting the tritium gas into tritiated water which is collected in desiccant. The scrubber consists of a stainless steel cracking chamber filled with catalyst (Engelhard #A16648) heated to a temperature of 1,0000° F. to ensure combustion of hydrocarbons over the catalyst including methane. The heat is provided by a tube furnace (Thermolyne Model F21125) which maintains a constant temperature to within 2 degrees. From there the effluent passes through a gas-to-gas condenser consistent of 20 turns of stainless steel tubing, cooled by a fan. The cooled effluent and condensate then pass through two molecular sieves connected in series, each made of stainless steel and filled with dessicant (Linde #5A). A centrifugal blower is attached to the outlet port of the molecular sieve to draw gasses out and into the exhaust stack ventilation. A getter bed consisting of 800 grams of zirconium-manganese-iron (St 909) alloy is positioned downstream of the centrifugal blower for the purpose of scavenging trace quantities of tritium before venting the chamber effluent.

The scrubber system is configured so that the deposition process can be carried out in a once flow-through mode or with the process system isolated. The latter is the preferred mode of operation where the chamber effluent gasses are continually processed yet the scrubber system volume is sufficiently large to ensure that the downstream pressure is below the required backing pressure for the turbo molecular pump.

The Lawrence Livermore scrubber has been operated for years without degradation of the catalyst. The molecular sieve will retain a water content of 15% of the dry weight of the desiccant prior to the breakthrough of tritium. Loaded drying flasks are then removed from the system, capped, and disposed of as tritiated water. This scrubber design reduces the tritium concentration in the effluent by one million times.

The intrinsic tritiated amorphous silicon layer was formed by initiating a discharge and introducing tritium gas into the reaction chamber. The structure of the tritium battery was nickel foil substrate, intrinsic layer of tritiated amorphous silicon, and zinc.

Figure 5:
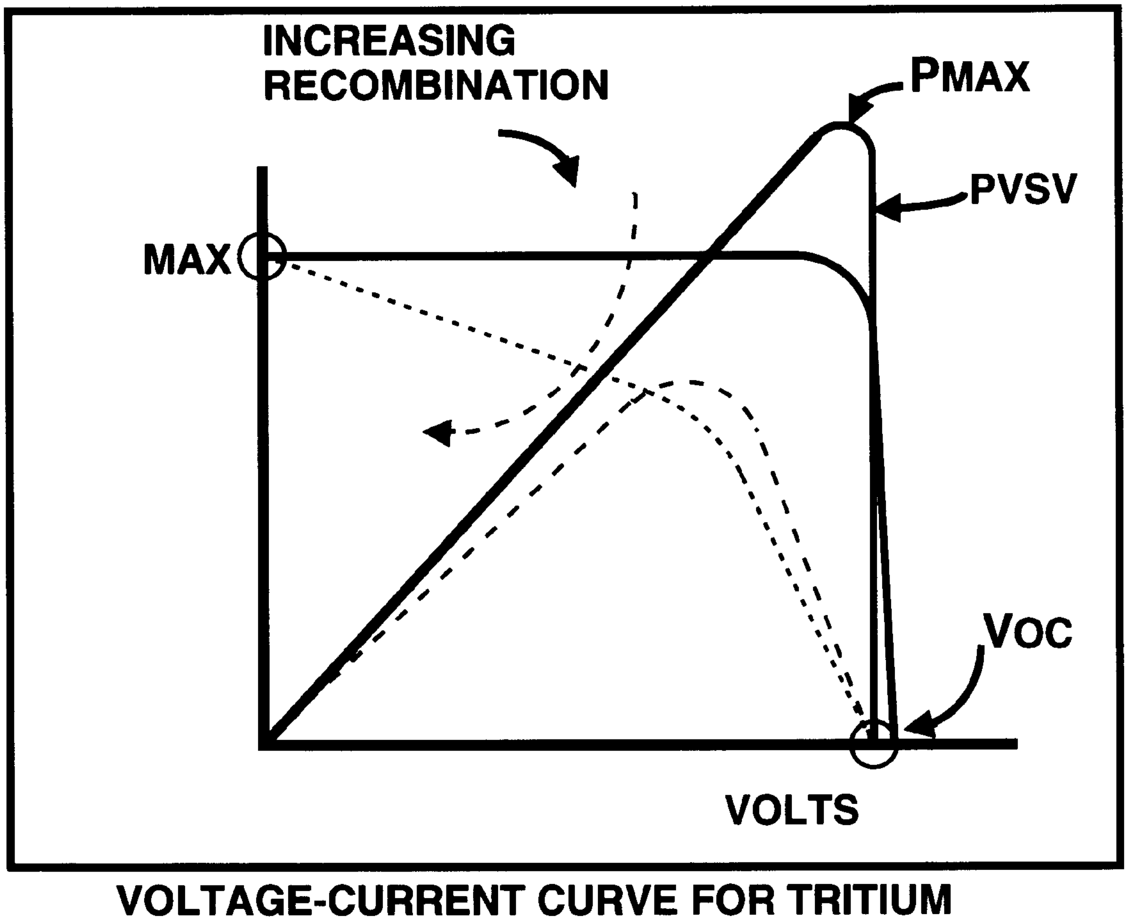
FIG. 5 is a voltage-current curve for an isotopic electric converter according to the instant invention.

Fourier transform infrared measurements indicated that tritium atoms were bonded with silicon atoms. The bonded tritium concentrations were up to 25 atom %. Tritium out-gassing measurements were performed on the tritiated amorphous silicon films and it was found that tritium was stably bonded in the film at room temperature up to 300° C. The short circuit current wand open circuit voltage are given in FIG. 5.

Tritiated amorphous films are mechanically stable, free of flaking or blistering, with good adherence to the substrate and may be simultaneously deposited onto both conducting and insulting substrates using a discharge in tritium plasma. The silicon layer sputtered in a tritium/argon ambient at temperatures below 300° C. results in a tritiated amorphous silicon film with the tritium concentration being variable from 5 to 30% depending upon deposition conditions.

The optimum tritiated amorphous silicon thickness is a tradeoff between capturing all the beta energy and collecting all the generated electron-hole pairs. Most of the beta energy is captured in a 2 $\mu$m thick film. Tritium batteries display a damage mechanism the same as the well known Staebler-Wronski degradation seen in all amorphous silicon photovoltaic devices. Staebler-Wronski degradation is driven by electron-hole recombination and manifests itself as a decrease in the carrier diffusion length. For hydrogenated amorphous silicon photovoltaic devices, the highest initial efficiency occurs for device thicknesses around 800 nm, but because of the degradation in diffusion length the highest stable efficiency is obtained for 350 nm devices. From a stability viewpoint, the maximum allowable tritiated amorphous silicon film thickness falls in the 200–500 nm range.

The maximum useable thickness of tritiated amorphous silicon film is limited by the degraded carrier diffusion length, and is too thin to capture all of the beta energy. However, good device design allows most of the beta energy to be captured in the semiconductor. The basic concept is to use a multilayer stack with the intermediate pairs being thin enough to be transparent. The outermost metal layers are thick enough to act as electron reflectors.

Figure 6:
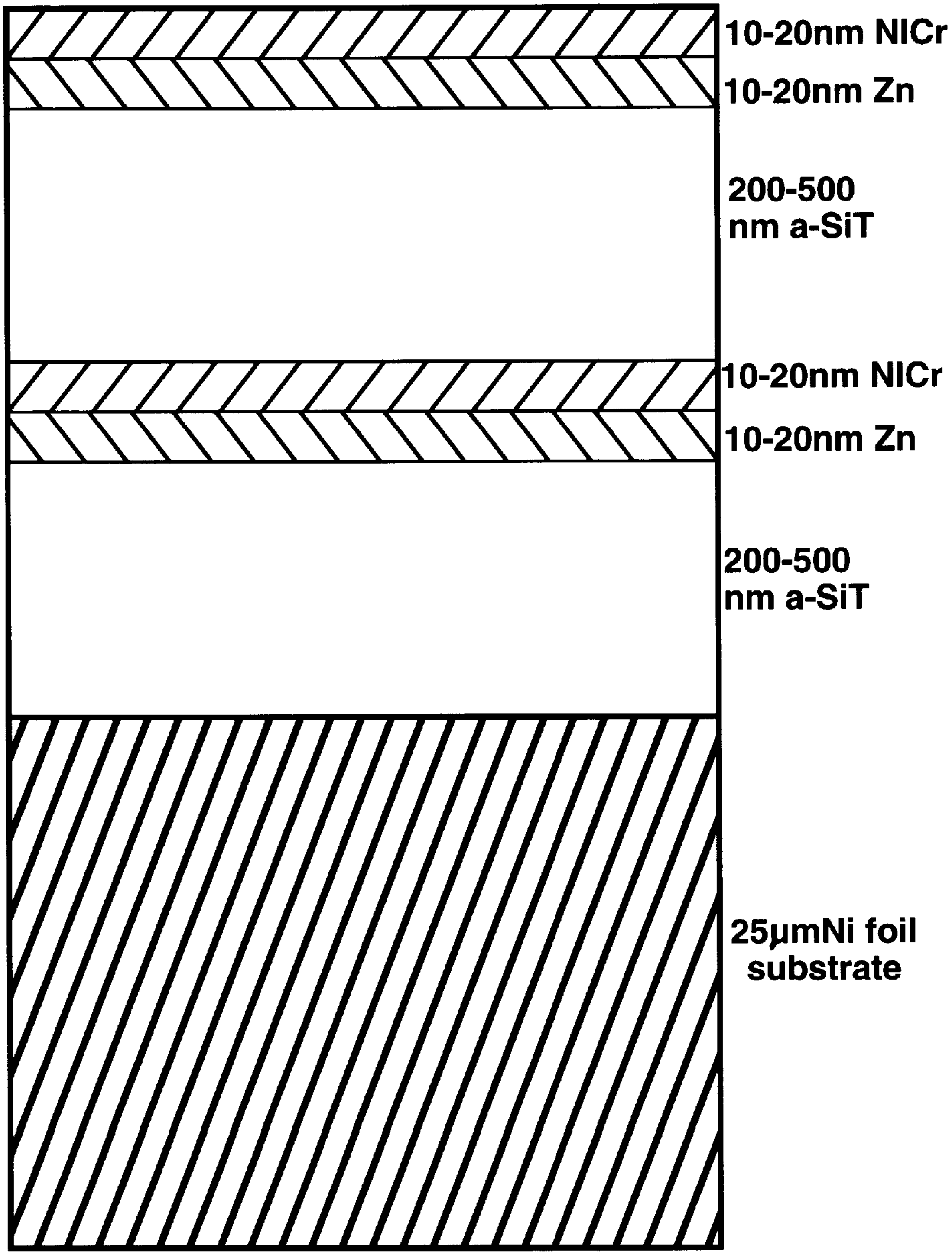
FIG. 6 is a side elevation view, in cross-section, of an isotopic electric converter according to the instant invention.

The stack structure shown in FIG. 6 provides a monolithic series connection resulting in the addition of the voltages from the individual cell units. The films are typically grown at a substrate temperature of 2000° C. with 10–30 atomic percent tritium incorporated into the film. The tritium concentration may be increased by reducing the deposition temperature, but at a cost of a reduction of carrier diffusion length. Cadmium sulfide (CdS) is a wide bandgap semiconductor with a density of 4.8 g/cm$^3$, more than double the density of silicon. The higher density will result in more efficient energy capture from high energy betas. In general, wide bandgap semiconductors have been found to be more radiation hard than low bandgap semiconductors, so cadmium sulfide may also be more stable.

The concept of intrinsic power conversion is achievable in tritiated amorphous silicon semiconductors for the purpose of low power applications. Tritiated amorphous silicon was used to make a contact potential battery of tritium battery with a specific power of 24 watts/Kg and an efficiency of 25%. Specific power is a function of the power density and the half-life of the isotope used. Measurements indicate that tritium was stably bonded in the amorphous silicon network. Products based upon this technology are currently being developed.

It is therefore apparent that the present invention accomplishes its intended objects. While the present invention has been particularly shown and described with respect to certain preferred embodiments thereof, it should be readily apparent to those of ordinary skill in the art that various changes and modifications in form and details may be made without departing from the spirit and scope of the invention as set forth in the claims.

Although this invention has been described above with reference to particular means, materials and embodiments, it is to be understood that the invention is not limited to these disclosed particulars, but extends instead to all equivalents within the scope of the following claims.

I claim:

1. An apparatus for converting radioactive decay energy directly into electricity, said apparatus comprising:

an electronegative region and a spaced apart electropositive region, said electronegative region and electropositive region both comprising a plurality of spaced apart metal foils within a semiconductor material; and a solid semiconductor medium disposed between said electronegative and electropositive regions, said solid semiconductor medium comprising a radioactive material and an ionizing flux for ionizing said semiconductor medium.

2. Apparatus as in claim 1 wherein said solid semiconductor medium comprises a material having a relatively high dielectric constant and a relatively low ionization potential.

3. Apparatus as in claim 1 wherein said semiconductor material comprises silicon.

4. Apparatus as in claim 1 wherein said semiconductor material comprises selenium.

5. Apparatus as in claim 1 wherein a radioactive material is homogeneously dispersed in said semiconductor material.

6. Apparatus as in claim 2 wherein said radioactive material decays by beta particle emission.

7. Apparatus as in claim 2 wherein said solid semiconductor medium is fabricated by simultaneous sputter deposition of said semiconductor material and said radioactive material.

8. Apparatus as in claim 7 wherein said solid semiconductor medium is fabricated by ion-sputter deposition of said semiconductor material within an atmosphere comprising the radioactive isotope in gaseous form.

9. Apparatus as in claim 8 wherein said radioactive gas is tritium.

10. Apparatus as in claim 8 wherein said radioactive gas is krypton.

11. An apparatus for generating an electric current comprising:

a plurality of elements, each element comprising electronegative and electropositive regions, both regions comprising a plurality of spaced apart metal foils within a semiconductor material, said regions being spaced apart and having a solid semiconductor medium disposed between them, said semiconductor medium comprising a radioactive material and an ionizing flux for ionizing said semiconductor medium; and said plurality of elements being electrically connected.

12. Apparatus as in claim 11 wherein said ionizing flux is from beta particle emission.

13. Apparatus as in claim 11 wherein said solid semiconductor medium comprises a radioactive material homogeneously dispersed in a semiconductive material.

14. Apparatus as in claim 11 wherein said semiconductive material comprises silicon.

15. Apparatus as in claim 11 wherein the elements are electrically connected in series.

16. Apparatus as in claim 11 wherein the elements are electrically connected in parallel.

17. Apparatus as in claim 11 wherein at least one of said electronegative or electropositive regions comprises a radioactive gas dispersed therein.

18. Apparatus as in claim 17 wherein said radioactive gas comprises tritium.

19. Apparatus as in claim 17 wherein said semiconductor medium comprises silicon.

20. An electrical energy device comprising:

an electronegative region and an electropositive region spaced apart, said electronegative and electropositive regions comprising a plurality of spaced apart metal foils within a semiconductor material;

a solid semiconductor medium disposed between said electronegative and electropositive regions, said solid semiconductive medium comprising a radioactive material and an ionizing flux for ionizing said semiconductor medium;

a thin-film capacitor assembly comprising two electrodes spaced apart with the gap between them filled with a dielectric material; and said capacitor assembly being electrically connected to the combination of said electronegative region, electropositive region and semiconductor medium.

* * * * *